S. HILL.
Milk-Cooler.
No. 227,007.       Patented April 27, 1880.
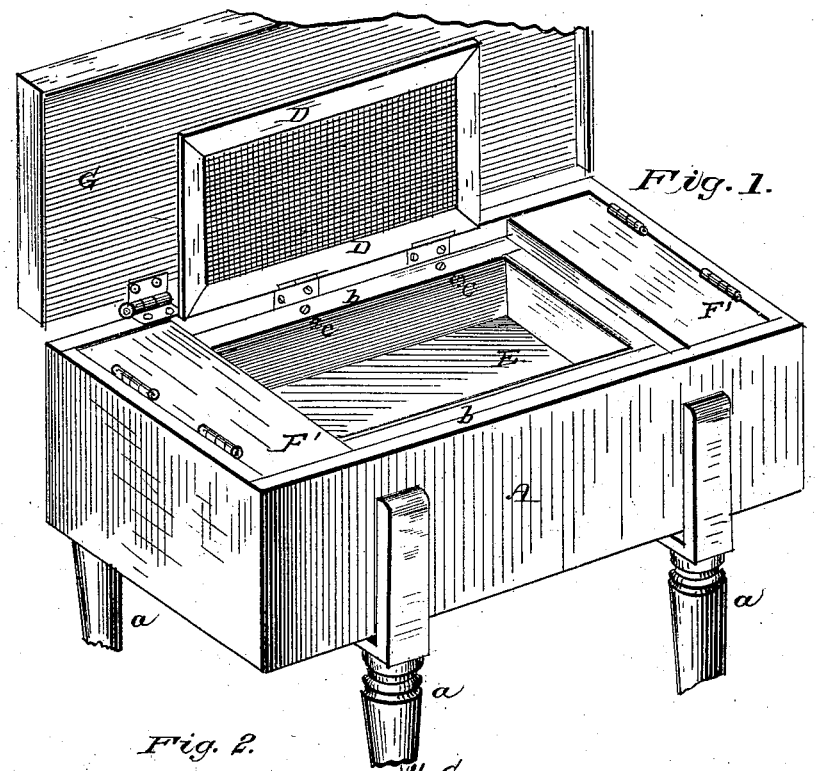
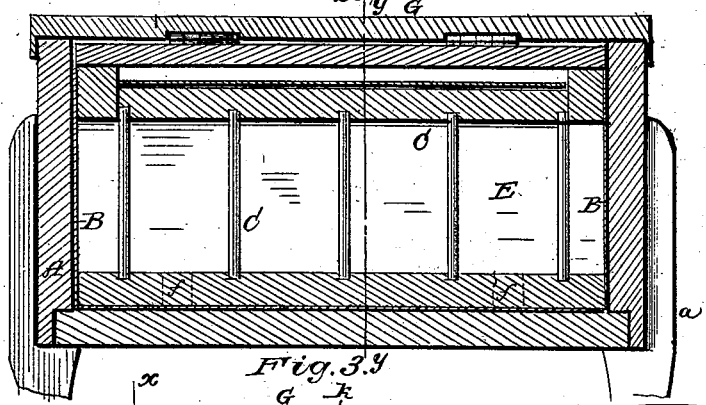
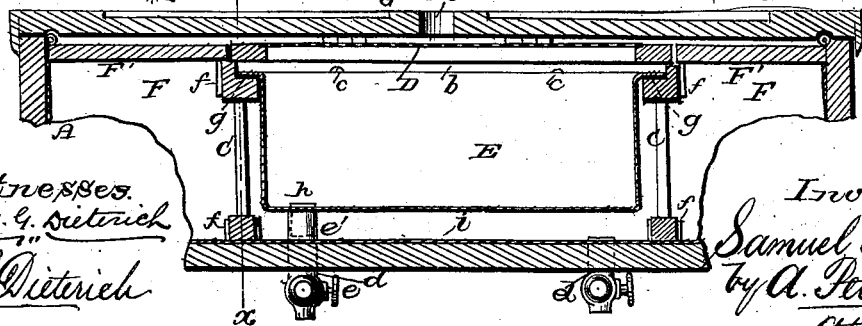

UNITED STATES PATENT OFFICE.

SAMUEL HILL, OF GREENSBOROUGH, VERMONT.

MILK-COOLER.

SPECIFICATION forming part of Letters Patent No. 227,007, dated April 27, 1880.

Application filed February 14, 1880.

*To all whom it may concern:*

Be it known that I, SAMUEL HILL, of Greensborough, in the county of Orleans and State of Vermont, have invented certain new and useful Improvements in Milk - Coolers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved milk setting and creaming vessel. Fig. 2 is a cross-section taken through line $x\ x$, Fig. 3; and Fig. 3 is a longitudinal section through line $y\ y$ in Fig. 2.

Similar letters of reference indicate corresponding parts in all the figures.

My invention has relation to apparatus for raising cream, or so-called "milk setting" and "creaming" vessels; and it consists in the construction and arrangement of parts of a refrigerating can or vessel of this class, as hereinafter more fully set forth, and particularly pointed out in the claim.

In the drawings, A is a wooden box, of rectangular shape and any suitable size, which is supported at a convenient height from the floor upon legs $a\ a$. Into this outer box or casing, A, is inserted a closely-fitting inner box, B, made of sheet-zinc or similar suitable material, which is held in place by the cleats $b\ b$ and their fastening-screws $c\ c$. This inside box or lining, B, is water-tight, but is provided with two drain-pipes, $d\ e$, in its bottom, one of which, $e$, has an upward-extending tube or sleeve $e'$. Both of these pipes or apertures are provided with suitably-constructed stop-cocks and water-seals, to prevent the ingress of the outer air into the box.

The inside box, B, is made with projecting cleats or ears $f\ f$ on its long sides and bottom, which receive transverse racks C C, the upper ends of which impinge upon the ends of the longitudinal cleats $b\ b$. The upper cross-bar of each of the racks C is recessed or rabbeted to receive flanges $g\ g$ of the removable inside creaming pan or vessel, E, which is provided with a pipe, $h$, that registers with and is inserted into the sleeve $e'$ of pipe $e$ in the bottom of box B A. This inner removable pan, E, is closed by a screen-cover, D, and does not extend down to the bottom of box B, but has an open air-space, $i$, under it, which opens up into the ice-boxes F F, one at each end of box B, which said ice-boxes are separated from pan E by the removable racks C C. Each of the ice-boxes F has a closely-fitting solid cover, F', and when the several covers, F' D F', are closed the whole apparatus may be closed by the hinged cover G, which is provided with a ventilating aperture or air-hole, $k$, over the screen-door D.

The milk to be creamed is poured into the pan E, and the ice-boxes F F are filled with ice, the water from which is drained off through the waste-pipe $d$, after which the several covers are closed until the cream has set, when the milk is drawn off through pipe $h\ e$.

In winter the side boxes, F F, and the space $i$ under pan E are filled with hot water, instead of ice, to cause the cream to set.

I am aware that it is not new to construct refrigerating-cabinets or milk-coolers with ice-boxes surrounding or on either side of the milk-pan, or with said pan supported upon detachable racks and provided with a screen-door or cover for excluding dirt and insects, while at the same time admitting the air, nor do I claim such construction and arrangement broadly.

Having thus described my improvement, I claim and desire to secure by Letters Patent of the United States—

The herein-described apparatus or vessel for setting and creaming milk, composed of the outer box or casing, A, elevated on legs $a\ a$, and provided with the hinged cover G, hinged screen-door D, end covers, F' F', and inside sheet-metal box, B, having waste-pipe $d$, detachable racks C C, and removable pan E, provided with the outlet $h$, all constructed and arranged substantially in the manner and for the purpose herein shown and set forth.

In testimony that I claim the foregoing as my own I have hereto affixed my signature in presence of two witnesses.

SAMUEL HILL.

Witnesses:
W. W. GOSS,
K. E. GOSS.